United States Patent
Abdelwahed et al.

(10) Patent No.: US 12,040,894 B1
(45) Date of Patent: Jul. 16, 2024

(54) BANDWIDTH UTILIZATION TECHNIQUES FOR IN-BAND REDUNDANT DATA

(71) Applicant: Cisco Technology, Inc., San Jose, CA (US)

(72) Inventors: Amir Salah Abdelsamie Abdelwahed, Cracow (PL); Ivana Balic, Studen (SE); Yusuf Ziya Isik, Edinburgh (GB); Xuehong Mao, San Jose, CA (US); Samer Lutfi Hijazi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 11 days.

(21) Appl. No.: 18/151,616

(22) Filed: Jan. 9, 2023

(51) Int. Cl.
*H04L 1/00* (2006.01)
*H04L 69/22* (2022.01)

(52) U.S. Cl.
CPC .......... *H04L 1/0041* (2013.01); *H04L 1/0002* (2013.01); *H04L 1/0045* (2013.01); *H04L 69/22* (2013.01)

(58) Field of Classification Search
CPC ................. H04L 1/0041; H04L 1/0002; H04L 1/0045; H04L 69/22
See application file for complete search history.

(56) References Cited

U.S. PATENT DOCUMENTS 10,447,430 B2 * 10/2019 Low ...................... H04L 1/0002
10,504,525 B2 * 12/2019 Sun ...................... G10L 19/0204
2017/0084280 A1    3/2017 Srinivasan et al.
2017/0103761 A1    4/2017 Sun et al.
2020/0204296 A1 *  6/2020 Srinivasan ............ G10L 19/005
2020/0219519 A1    7/2020 Wang
2021/0234632 A1    7/2021 Low et al.

OTHER PUBLICATIONS

Schubert Foo, et al., "Enhancing the Quality of Low Bit-Rate Real-Time Internet Communication Services," Internet Research: Electronic Networking Applications and Policy, 1999, 19 pages.
C. Perkins, et al., "RTP Payload for Redundant Audio Data," Network Working Group, Request for Comments: 2198, Category: Standards Track, Sep. 1997, 11 pages.
Pranav Dar, "NVIDIA's DL Model can Complete the Missing Parts ina Photo with Incredible Results!" Analytics Vidhya, https://www.analyticsvidhya.com/blog/2018/04/nvidias-deep-learning-model-reconstruct-incomplete-photos-incredible-results/, Apr. 25, 2018, 4 pages.
"Video super-resolution," Wikipedia, Last edited: Nov. 6, 2022, retrieved from the Internet Jan. 9, 2023, 20 pages.

* cited by examiner

*Primary Examiner* — Cynthia Britt
(74) *Attorney, Agent, or Firm* — Edell, Shapiro & Finnan, LLC (57) ABSTRACT

In some aspects, the techniques described herein relate to a method including: encoding a current data portion to generate an encoded current data portion for inclusion in a data packet; encoding, based upon content of the current data portion, a forward error correction data portion for a previous data portion to generate an encoded forward error correction data portion; generating the data packet including the encoded current data portion and the encoded forward error correction data portion; and providing the data packet to a receiver.

20 Claims, 6 Drawing Sheets

BANDWIDTH UTILIZATION TECHNIQUES FOR IN-BAND REDUNDANT DATA

TECHNICAL FIELD

The present disclosure relates to data transmission with forward error correction.

BACKGROUND

In telecommunications, information theory, and coding theory, forward error correction (FEC) or channel coding is a technique used for controlling errors in data transmission. According to FEC techniques, the provider or sender of some data encodes the data in a redundant way, most often by using an error correction code transmitted in a later provided data frame or packet. In the event the entity intended to obtain the data fails to receive the initially provided data frame or packet, the FEC data in the subsequently sent data frame or packet may be used to determine the data which would have otherwise been lost.

DETAILED DESCRIPTION

Overview

In some aspects, the techniques described herein relate to a method including: encoding a current data portion to generate an encoded current data portion for inclusion in a data packet; encoding, based upon content of the current data portion, a forward error correction data portion for a previous data portion to generate an encoded forward error correction data portion; generating the data packet including the encoded current data portion and the encoded forward error correction data portion; and providing the data packet to a receiver.

In some aspects, the techniques described herein relate to a method including: obtaining a first data packet; obtaining a second data packet; extracting first forward error correction data for a third data packet from the first data packet; extracting second forward error correction data for the third data packet from the second data packet; and recreating data of the third data packet from the first forward error correction data and the second forward error correction data with a higher quality than the first forward error correction data and the second forward error correction data.

In some aspects, the techniques described herein relate to an apparatus including: one or more network interfaces; and one or more processors configured to: encode a current data portion to generate an encoded current data portion for inclusion in a data packet; encode, based upon content of the current data portion, a forward error correction data portion for a previous data portion to generate an encoded forward error correction data portion; generate the data packet including the encoded current data portion and the encoded forward error correction data portion; and provide the data packet to a receiver via the one or more network interfaces.

Example Embodiments

During an internet protocol (IP) data transmission, such as an IP voice call or other internet-based communication, packet loss happens. In the case of audio communications, such packet loss may result in poor audio quality. To compensate for packet loss, in-band forward error correction (FEC) may be implemented in the IP packets. FEC techniques include sending redundant information about previous packets in the current packet. For example, a data packet (sometimes referred to as a data frame) sent at time $t_n$ may include data for time $t_n$ as well as lower quality versions of the data sent at a previous times, such as the data sent at $t_{n-1}$ and/or time $t_{n-2}$. The FEC data for times $t_{n-1}$ and/or time $t_{n-2}$ transmitted at time $t_n$ allows for the recreation of the data sent at times $t_{n-1}$, and/or time $t_{n-2}$ in the event the packets sent at time $t_{n-1}$, and/or time $t_{n-2}$ are lost. However, because the recreation of the data is based upon lower quality versions of the previously sent data, the recreation of the data is imperfect, and may be of lower quality than data received in the packets sent at times $t_{n-1}$, and time $t_{n-2}$ The techniques disclosed herein may provide for the recreation of lost packet data that is of higher quality.

Example embodiments of the disclosed techniques provide redundancy via an in-band FEC scheme to improve communication quality in case of packet losses. On the transmit side, the techniques are directed to sending multiple in-band FEC portions via different data packets. In other words, the data sent at time $t_n$ is also sent at times $t_{n+1}$, $t_{n+2}$, etc. The disclosed techniques also utilize future data to provide better FEC data. For example, FEC data sent at time $t_{n+1}$ for the data initially sent at time $t_n$ may be quantized or encoded based upon the data being sent at time $t_{n+1}$. Furthermore, the techniques may dynamically allocate the bandwidth to the current data portion and the FEC portions. The techniques may also provide for methods to create multiple FEC encoding representations of the same past data portion utilizing the newly available context provided by the data at time $t_{n+1}$.

The disclosed techniques also combine these multiple representations on the receive side to recreated lost data with higher quality than may be achieved using any single one of the FEC data portions. For example, if a packet sent at time $t_n$ is lost, the receive side may use FEC data received at both time $t_{n+1}$ and time $t_{n+2}$ to recreate the data from time $t_n$ that was lost. This recreated data may be of higher quality (e.g., higher bitrate) than either of the FEC data received at time $t_{n+1}$ and time $t_{n+2}$. Other example embodiments may utilize a greater number of FEC data portions, i.e., three or more FEC data portions, to recreate the data from time $t_n$ that was lost. Example packets configured to implement the transmit and receive side techniques of this disclosure will now be described with reference to FIG. 1.

Figure 1:
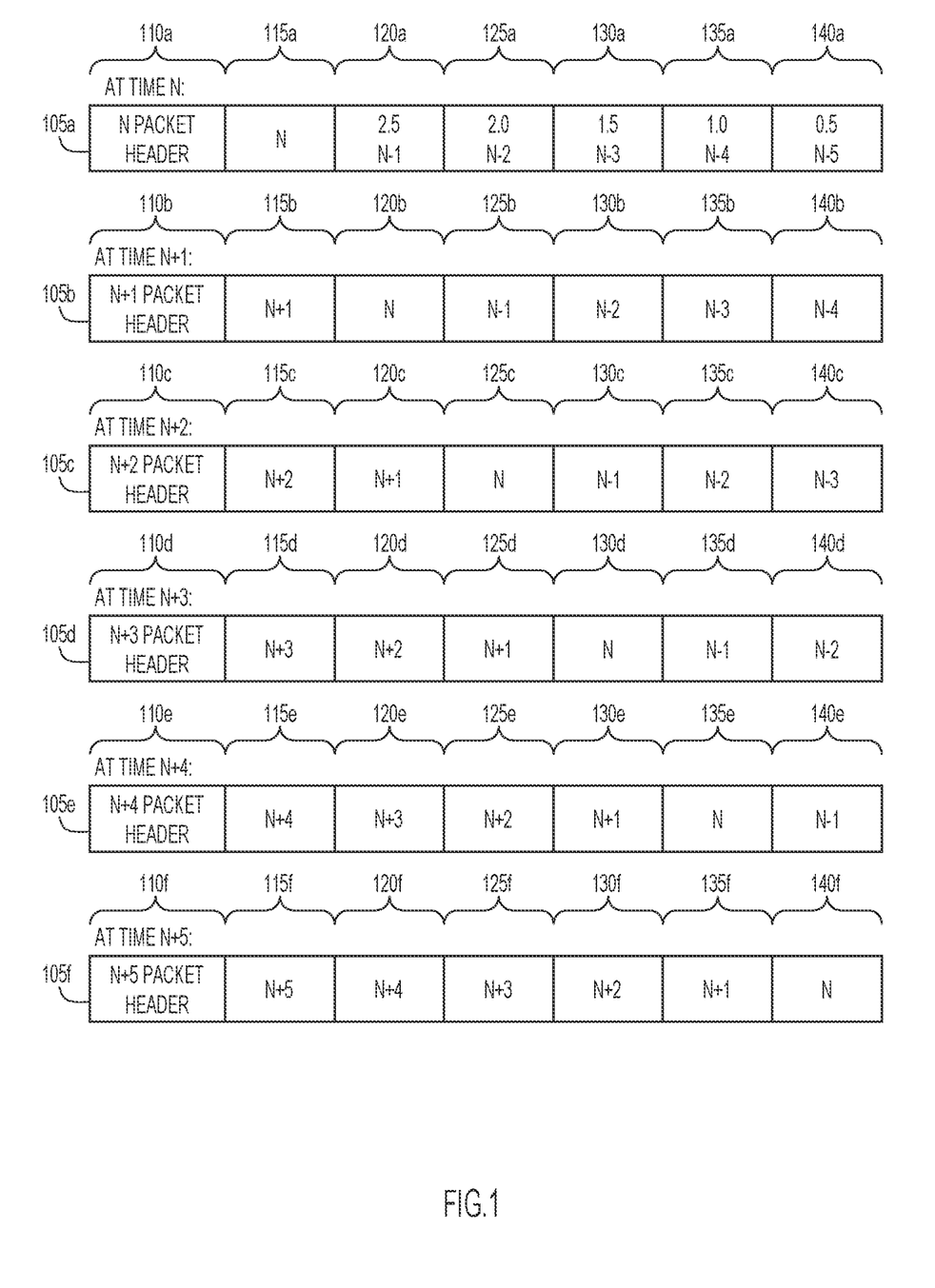
FIG. 1 is an illustration of a series of data packets, including their respective forward error correction portions, configured according to an example embodiment of the techniques disclosed herein.

Illustrated in FIG. 1 are a series of data packets 105a-f, sent at times $t_n$, $t_{n+1}$, $t_{n+2}$, $t_{n+3}$, $t_{n+4}$ and $t_{n+5}$, respectively. Packet 105a includes header 110a, current data portions 115a, and FEC portions 120a, 125a, 130a, 135a and 140a. Packets 105b-f contain analogous headers 110b-f, current data portions 115b-f and FEC portions 120b-f, 125b-f, 130b-f, 135b-f and 140b-f, respectively.

The current data for packet 105a is included in current data portion 115a, and redundant data for previously sent packets is included in FEC portions 120a-140a. Packet 105b is sent at time $t_{n+1}$ subsequent to packet 105a. Accordingly, FEC portion 120b of packet 105b includes a redundant version of the data sent in current data portion 115a of packet 105a. Similarly, FEC portion 125b of packet 105b contains a redundant version of the data contained in FEC portion 120a of packet 105a. FEC portions 130b, 135b and 140b of packet 105b contain redundant versions of the data contained in FEC portions 125a, 130a and 135a of packet 105a, respectively.

However, the redundant data contained in FEC portions 120b, 125b, 130b, 135b and 140b of packet 105b is not identical to the corresponding data contained in current data portion 115a, and FEC portions 120a, 125a, 130a, and 135a of packet 105a. The data contained in each of FEC portions 120b, 125b, 130b, 135b and 140b of packet 105b is encoded at a lower bitrate than the data contained in current data portion 115a, FEC portions 120a, 125a, 130a, and 135a of packet 105a, respectively. For example, if the data in the current data portion 115a of packet 105a is encoded at 5 kbps, then the redundant version of this data contained in FEC portion 120b of packet 105b may be encoded at 2.5 kbps. Similarly, if the data contained in FEC portion 120a of packet 105a is encoded at 2.5 kbps, the redundant version of this data contained in FEC portion 125b may be encoded at 2.0 kbps. This decreasing bitrate for the redundant data in subsequent packets will also hold true for FEC portions 130a and 135a of packet 105a, whose redundant data will be encoded at lower bitrates within FEC portions 135b and 140b of packet 105b. However, there is no redundant data in packet 105b corresponding to FEC portion 140a of packet 105a as subsequent packets only contain redundant data for five previous packets.

As illustrated through packets 105b-f, redundant versions of the current data from current data portion 115a of packet 105a is sent five times with decreasing bitrate—at 2.5 kbps in FEC portion 120b of packet 105b, at 2.0 kbps in FEC portion 125c of packet 105c, at 1.5 kbps in FEC portion 130d of packet 105d, at 1 kbps in FEC portion 135e of packet 105e, and at 0.5 kbps in FEC portion 140f of packet 105f.

If packet 105a is lost, but packets 105b-f are obtained at the receive side (i.e., the decoder side), the receive side will have multiple redundant copies of the data contained within current data portion 115a. These multiple copies of the redundant data may be combined at the receive side to reconstruct the data from current data portion 115a of packet 105a with higher quality than the data contained in any one of FEC portions 120b, 125c, 130d, 135e or 140f.

Figure 2:
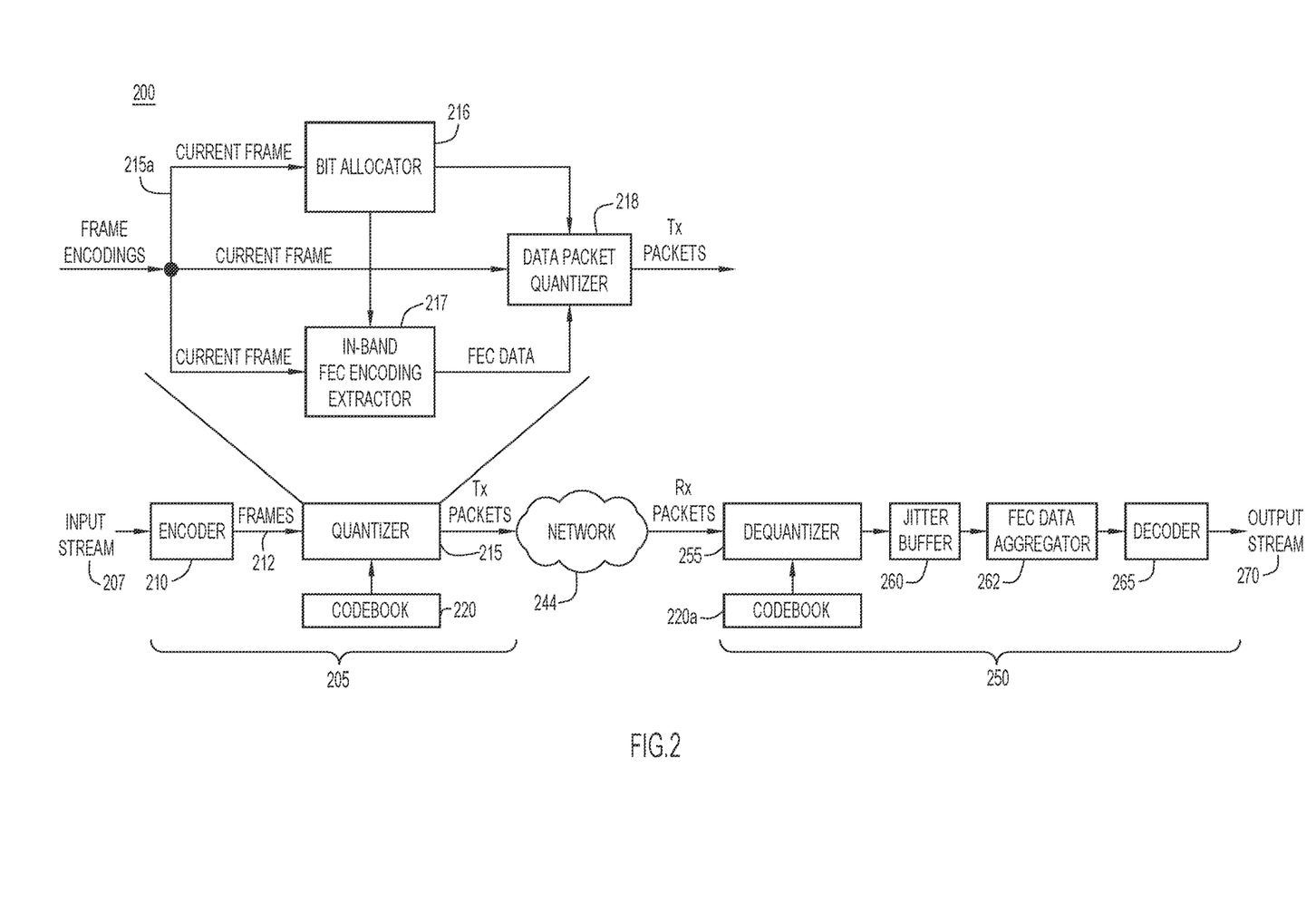
FIG. 2 is a functional block diagram of a communication system configured to implement the disclosed in-band redundant data techniques, according to an example embodiment.

Turning to FIG. 2, depicted therein is a system 200 configured to implement the techniques of this disclosure. System 200 provides the overall system diagram for an audio codec system. In a neural audio codec system, the encoder may be a neural network that down samples the audio in time and generates per packet encodings in some latent semantic feature space. The techniques proposed herein are disclosed with respect to a general in-band FEC enrichment strategy. However, the techniques may also be applied to any transform based audio codec, as well as to any appropriate quantized data communication system.

System 200 includes a transmit side 205 and a receive side 250. The transmit side 205 includes an encoder 210, a quantizer 215, and a codebook 220. Encoder 210 receives input stream 207, which is embodied as an audio stream in the current example, and utilizes a codec to convert the analog audio signals of audio stream 207 into encoded data portions or frames 212. The encoded data portions 212 are compressed by quantizer 215 and then provided over network 244 to receive side 250. Quantizer 215 may be embodied a multi-layer vector quantizer (VQ), such as a residual vector quantizer or a product quantizer. The codebook(s) 220/220a of such quantizers are shared by both transmit side 205 and receive side 250 and only the indices of the codewords that are used in each quantization layer are included in the data packets provided to receive side 250. Accordingly, codebook 220 is used by transmit side 205 to determine the indices of the codewords for the quantized data, and codebook 220a is used by receive side 250 to decode the obtained indices back to audio samples using decoder 265, which is typically another neural network.

Included in FIG. 2 is a detailed view 215a of quantizer 215, illustrating that quantizer 215 includes three functional elements—bit allocator 216, in-band FEC encoding extractor 217, and data packet quantizer 218. As illustrated in detailed view 215a, the current data for the current packet is sent to each of bit allocator 216, in-band FEC encoding extractor 217 and data packet quantizer 218. Data packet quantizer 218 directly quantizes the current data received from encoder 210 for inclusion in the current data packet. In-band FEC encoding extractor 217, on the other hand, provides FEC data to be included in the current data packet. In other words, in-band FEC encoding extractor 217 provides FEC data for FEC portions 120a-f, 125a-f, 130a-f, 135a-f and 140a-f illustrated in packets 105a-f of FIG. 1. In-band FEC encoding extractor 217 may apply different transformations on the FEC data depending on the time associated with the FEC data it is providing. For example, if system 200 is used to encode data like that illustrated in packets 105a-f of FIG. 1, in-band FEC encoding extractor 217 will provide FEC data at progressively lower bitrates for the same redundant data transmitted in subsequent packets. According to other examples, in-band FEC encoding extractor 217 encodes FEC data using different encoding schemes depending on the time associated with the FEC data it is providing. Additionally, in-band FEC encoding extractor 217 may dynamically adjust how it encodes FEC data based upon the output of bit allocator 216, as described in detail below.

According to the disclosed techniques, in-band FEC encoding extractor 217 generates multiple views of the same data encodings, possibly with the help of additional future context becoming available as the encoding progresses in time. For example, as illustrated in FIG. 2, in-band FEC encoding extractor 217 receives the current data frame even though it will be encoding data initially sent in previous data packets. The content of the current data frame may inform how in-band FEC encoding extractor 217 encodes the FEC data to be included in the packet with the current data. In other words, the current data received by in-band FEC encoding extractor 217 provides "future" context for the previously sent data to be included in the FEC portions of the current packet. The use of this information in generating the FEC data for the current packet may differ from how related art systems prepare FEC data. For example, in some related art systems, minimal latency may be desired on the transmit side. Specifically, it may be desired that the packets be transmitted from the transmit side to the receive side with ideally zero algorithmic latency. Accordingly, in such systems, the FEC encoding included in the current packet depends only on the past data. Typical implementations of such an encoder in neural codecs would involve causal strided convolutions, unidirectional recurrent networks, or causal multi-head attention layers. However, in quantizer 215 all the data up to the current data may be utilized when encoding data for FEC data corresponding to previously sent data packets. Hence, in-band FEC encoding extractor 217 may utilize the now available current data and its "future" context when encoding past data portions as FEC data. Accordingly, in-band FEC encoding extractor 217 may generate multiple enriched representations of a data portion for every temporal position. The combination of these multiple representations on receive side 250 may yield higher quality than any single one of them.

The FEC representations provided by in-band FEC encoding extractor 217 may all be quantized by data packet quantizer 218 using the same quantizer. According to other examples, quantizer 218 may be adapted to process the multiple FEC representations differently. For example, in a VQ quantizer, quantizer 218 may use a different quantizer for the current and FEC data versus previous FEC data. According to other examples, quantizer 218 may use a different quantizer for every FEC data portion.

Also illustrated in detailed view 215a is bit allocator 216 which may be used to determine an optimal strategy to allocate the bits of the current packet to the current data and the FEC data. Related art techniques may allocate the bits of the current packet between the current data and the FEC data using fixed strategies. One such fixed strategy may uniformly distribute the available bandwidth between the current data and the FEC data. Another fixed strategy may allocate more bandwidth to the current data and allocate diminished bandwidth to the FEC data. Bit allocator 216, on the other hand, may control in-band FEC encoding extractor 217 and data packet quantizer 218 such that the bit allocation strategy may be dynamically altered based upon, for example, the position and context of both the current data and the FEC data. Based on the current data and the FEC data, bit allocator 216 may determine how many bits to allocate each data packet, as well as how many bits within each packet to allocate to the current data and the FEC data. For example, bit allocator 216 may allocate more bits to high entropy data that is harder to predict, and less bits to data that is low entropy such as silent data portions. Accordingly, FEC data associated with silent data portions may be allocated fewer bits within a packet as low bitrate FEC data may be sufficient to recreate such silent data in the event the packet that initially sent the silent data is lost. On the other hand, if the current data being sent is for a silent audio portion and one or more of the FEC data portions being sent are for high entropy data, bit allocator 216 may allocate more bits to the one or more FEC portions than to the current data portion. The logic implemented through bit allocator 216, particularly for use with neural audio codecs, may be built using self-attention layers with positional embeddings or convolutional layers.

Once quantized, data packets are provided from transmit side 205 to receive side 250 via network 244. Upon obtaining the packet at receive side 250, dequantizer 255 dequantizes the packet. If a single quantizer was used to quantize the packet, a single dequantizer may be used to dequantize the packet. If multiple quantizers were used to quantize the packet, multiple dequantizers may be used to dequantize the packet. For example, if one of the FEC portions contained within the packet was quantized using one or more quantizers that differ from the quantizer used to quantize the current data portion, a corresponding number of dequantizers may be used to dequantize the FEC portions of the packet at receive side 250. Dequantizer 255 decompresses the data contained within the packet using codebook 220a, which is a receive side version of codebook 220 of transmit side 205. The uncompressed encoded data is provided to jitter buffer 260, which collects encoded data from multiple packets so that it can be processed.

According to related art techniques, jitter buffer 260 collects data from multiple packets so that the data may be processed smoothly. Jitter buffer 260 may also provide this function in receive side 250. However, jitter buffer 260 may also implement the techniques of this disclosure by collecting multiple data packets so that the FEC data from multiple packets may be combined to recreate data from a lost packet. Using packets 105a-f from FIG. 1 as an example, if packet 105a is lost, jitter buffer 260 may collect packets 105b-f so that the FEC data from FEC portion 120b of packet 105b, FEC portion 125c of packet 105c, FEC portion 130d of packet 105d, FEC portion 135e of packet 105e, and FEC portion 140f of packet 105f may be combined in FEC data aggregator 262 to recreate the lost data from current data portion 115a of packet 105a.

Jitter buffer 260 provides the data it collects to FEC data aggregator 262. For current packet data, jitter buffer 260 may provide only the current data to FEC data aggregator 262 which passes the current packet data to decoder 265. However, if a packet is lost, jitter buffer 260 may provide multiple FEC representations to FEC data aggregator 262. FEC data aggregator 262 may then combine the multiple FEC representations into a single encoding, which is then fed to the decoder 265. Decoder 265 decodes the data it receives from FEC data aggregator 262 to create output stream 270, which may be embodied as an analog audio output stream.

As discussed above, FEC data aggregator 262 combines multiple FEC representations in order to recreate a lost or otherwise unobtained current data portion. For example, FEC data aggregator 262 may combined multiple FEC representations (e.g., FEC portions 120b, 125c, 130d, 135e and 140f from packets 105b-f, respectively, of FIG. 1) using a nonlinear transform of the FEC data. To implement such a non-linear transform, FEC data aggregator 262 may be embodied to include a neural network layer. The neural network layer of FEC data aggregator 262 may be custom designed based upon the type of data sent between transmit side 205 and receive side 250. For example, if audio data is being communicated, the neural network layer of FEC data aggregator 262 may be designed to aggregate audio FEC data. If video data is being communicated, the neural network layer of FEC data aggregator 262 may be designed to aggregate video FEC data. Additionally, the neural network layer of FEC data aggregator 262 may be trained using FEC data sets quantized using the same FEC data quantization techniques implemented by quantizer 215 of transmit side 205.

Figure 3:
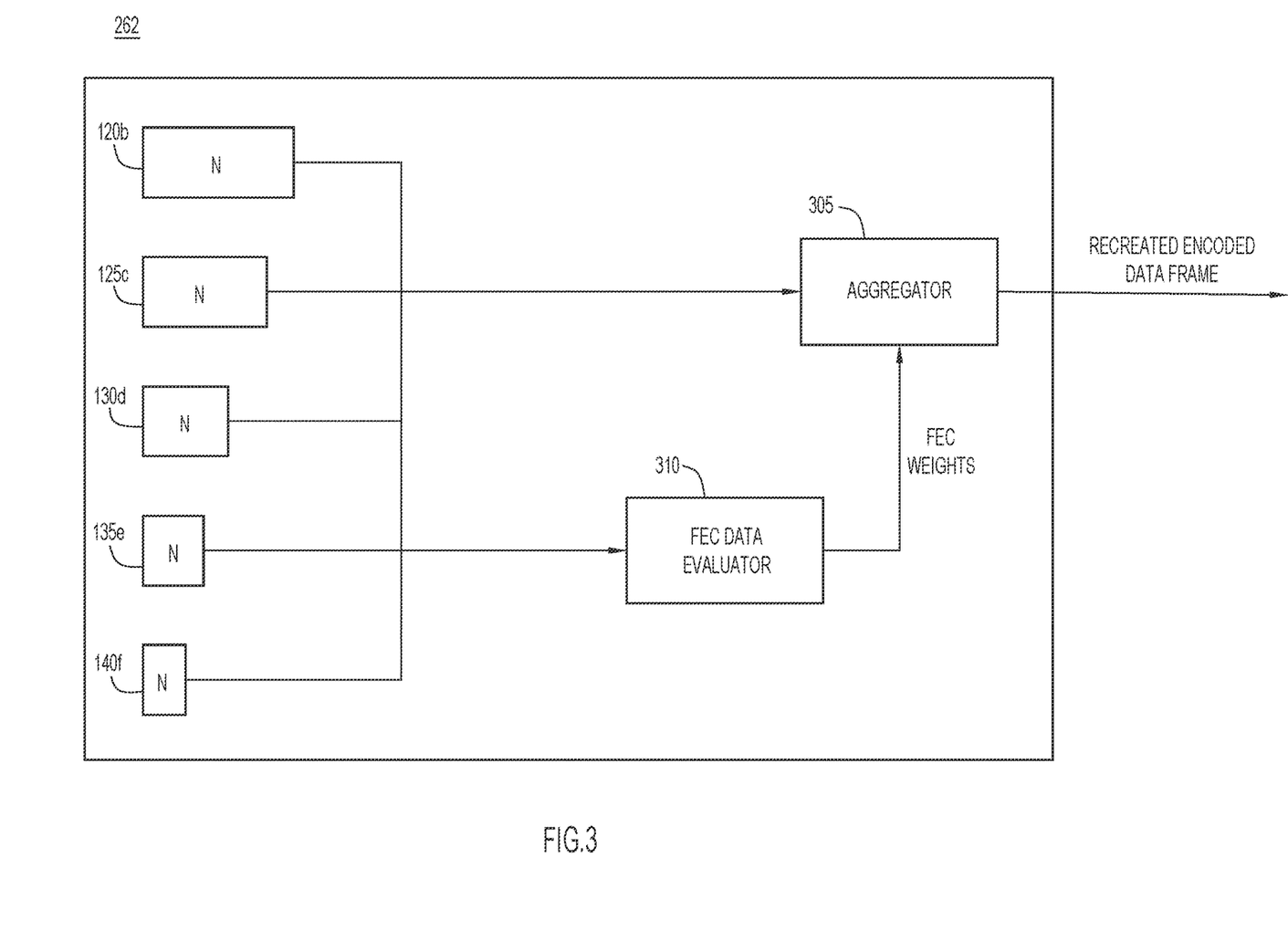
FIG. 3 is a functional block diagram of a forward error correction data aggregator configured to implement the disclosed in-band redundant data techniques, according to an example embodiment.

According to other examples, FEC data aggregator may be configured to combine multiple FEC representations based upon weights determined for each of the FEC portions, as will now be described with reference to FIG. 3. As illustrated in FIG. 3, FEC data aggregator 262 may include aggregator 305 and FEC data evaluator 310. FEC portions 120*b*, 125*c*, 130*d*, 135*e* and 140*f* are provided to both FEC data evaluator 310 and aggregator 305. FEC data evaluator 310 evaluates one or more features of FEC portions 120*b*, 125*c*, 130*d*, 135*e* and 140*f* to determine how the aggregator 305 should combine the FEC portions.

For example, if FEC portions 120*b*, 125*c*, 130*d*, 135*e* and 140*f* are encoded at different bitrates, FEC data evaluator 310 may determine these bitrates and then provide FEC weights to aggregator 305 to be used when aggregating FEC portions 120*b*, 125*c*, 130*d*, 135*e* and 140*f*. If FEC portions 120*b*, 125*c*, 130*d*, 135*e* and 140*f* are encoded at 2.5 kbps, 2 kbps, 1.5 kbps 1.0 kbps and 0.5 kbps, respectively, then FEC data evaluator 310 may provide FEC weights to aggregator 305 in proportion to these bitrates. According to a specific example, FEC data evaluator 310 provides weights that are proportional to the bitrates of the FEC portions and which are normalized to 1. Accordingly, FEC data evaluator 310 may provide weights of 0.33 for FEC portions 120*b*, 0.26 for FEC portion 125*c*, 0.2 for FEC portion 130*d*, 0.13 for FEC portion 135*e* and 0.067 for FEC portion 140*f*. Aggregator 305 will, in turn, apply these weights when combining FEC portions 120*b*, 125*c*, 130*d*, 135*e* and 140*f*.

FEC data evaluator 310 may also use additional information to determine the weights provided to aggregator 305. For example, FEC data evaluator 310 may consider the position in time of the packet from which a FEC portion is received when determining how to weight the FEC portions. As noted above, if the bitrate of the FEC portions associated with a lost packet decreases with each subsequent packet, the weights applied to the FEC portions may decrease. According to other examples, later sent FEC portions may be encoded with additional context in the form of the data sent subsequent to the data in the lost packet. Accordingly, these later received FEC portions more be more highly weighted than earlier received FEC portions. According to still other examples, the current data portions of subsequently received packets may be used by FEC data evaluator 310 when providing weights to aggregator 305. Specifically, just as the future context may be used in the encoding of FEC portions 120*b*, 125*c*, 130*d*, 135*e* and 140*f* at transmit side 205 of FIG. 2, this same future context may be used when determining how to weight FEC portions 120*b*, 125*c*, 130*d*, 135*e* and 140*f* at receive side 250. Accordingly, FEC data evaluator 310 may be configured to receive current data from packets sent subsequent to the lost packet and use this future context when providing weights to aggregator 305 for FEC portions 120*b*, 125*c*, 130*d*, 135*e* and 140*f*.

According to other examples, FEC data evaluator 310 may select fewer than all of FEC portions 120*b*, 125*c*, 130*d*, 135*e* and 140*f* to use in the recreation of the data from lost packet. For example, FEC data evaluator 310 may consider the entropy of the data encoded in FEC portions 120*b*, 125*c*, 130*d*, 135*e* and 140*f*. If one or more of the FEC portions 120*b*, 125*c*, 130*d*, 135*e* and 140*f* contains sufficiently low entropy, it may be determined that the FEC portions are associated with a silent audio data portion. Accordingly, FEC data evaluator 310 may indicate to aggregator 305 that fewer than all of FEC portions 120*b*, 125*c*, 130*d*, 135*e* and 140*f* are necessary to recreate the unobtained current data portion. FEC data evaluator 310 may indicate that that only the highest bitrate FEC portion is needed. According to other examples, if the entropy in the FEC portions 120*b*, 125*c*, 130*d*, 135*e* and 140*f* is sufficiently low, FEC data evaluator 310 may indicated that only the lowest bitrate FEC portion is needed, thereby decreasing the compute resources to decode the FEC data.

Figure 4:
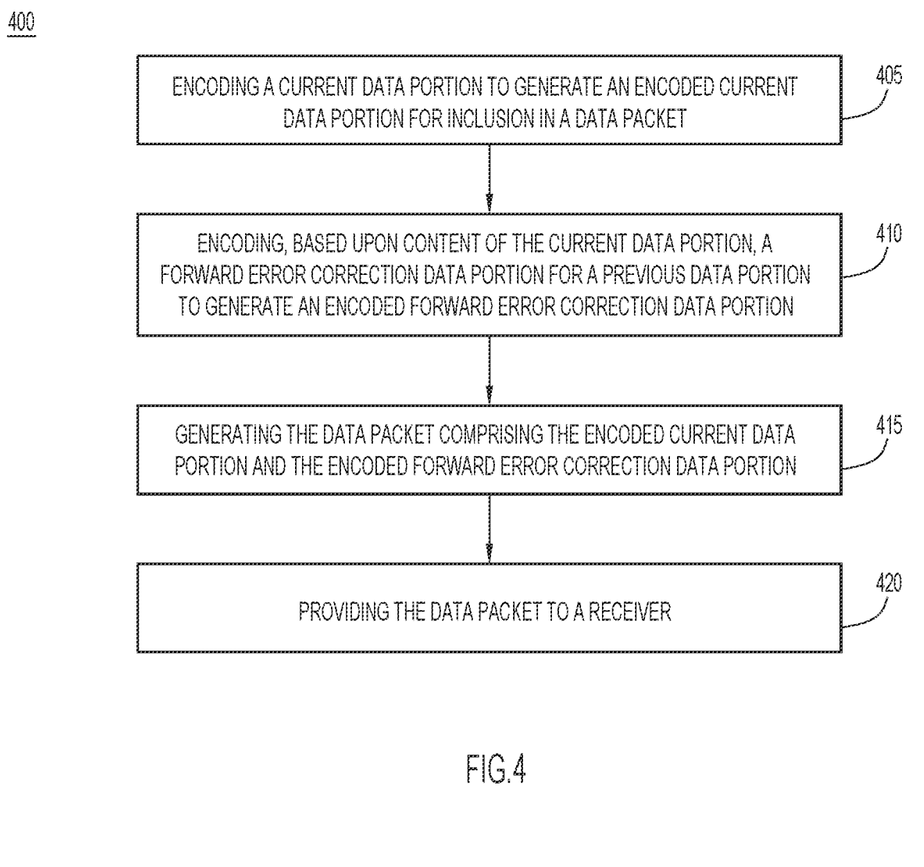
FIG. 4 is a flowchart illustrating a process flow for implementing the disclosed in-band redundant data techniques on the transmit side of a communication system, according to an example embodiment.

With reference now made to FIG. 4, depicted therein is a flowchart 400 illustrating a process flow for implementing the techniques of this disclosure on the transmit side of a communication system, such as the transmit side 205 of FIG. 2.

The process flow of flowchart 400 begins in operation 405 in which a current data portion is encoded to generate an encoded current data portion for inclusion in a data packet. Accordingly, operation 405 may be embodied as the encoding of data to be included in a current data portion 110*b-f* of a respective packet 105*b-f*, as illustrated in FIG. 1.

Flowchart 400 continues in operation 410 in which a forward error correction portion is encoded to generate an encoded forward error correction data portion. The encoding of operation 410 is based upon the content of a previous data portion. Accordingly, operation 410 may be embodied as the encoding of one or more of FEC portions 120*b*, 125*c*, 130*d*, 135*e* and/or 140*f* of packets 105*b-f*, respectively, based upon the content of current data portion 115*a* of packet 105*a*.

In operation 415, the data packet is generated such that it includes the encoded current data portion encoded in operation 405 and the encoded forward error correction data portion encoded in operation 410. Therefore, continuing with the example of FIG. 1, operation 415 may be embodied as the generation of packet 105*b* such that it includes current data portion 115*b* corresponding to the encoded current data portion and FEC portion 120*b* corresponding to the encoded forward error correction data portion. Operation 415 may also be embodied as the generation of packet 105*c* such that it includes current data portion 115*c* corresponding to the encoded current data portion and FEC portion 125*c* corresponding to the encoded forward error correction data portion. Similarly, operation 415 may be embodied as the generation of packet 105*d*, 105*e* or 105*f* such that it includes its respective current data portion 115*d-f* and the FEC data portion corresponding to the current data portion of packet 105*a*.

Finally, in operation 420, the data packet is provided to a receiver. Accordingly, operation 420 may be embodied as transmit side 205 of FIG. 2 providing the data packet to receive side 250 also of FIG. 2.

Figure 5:
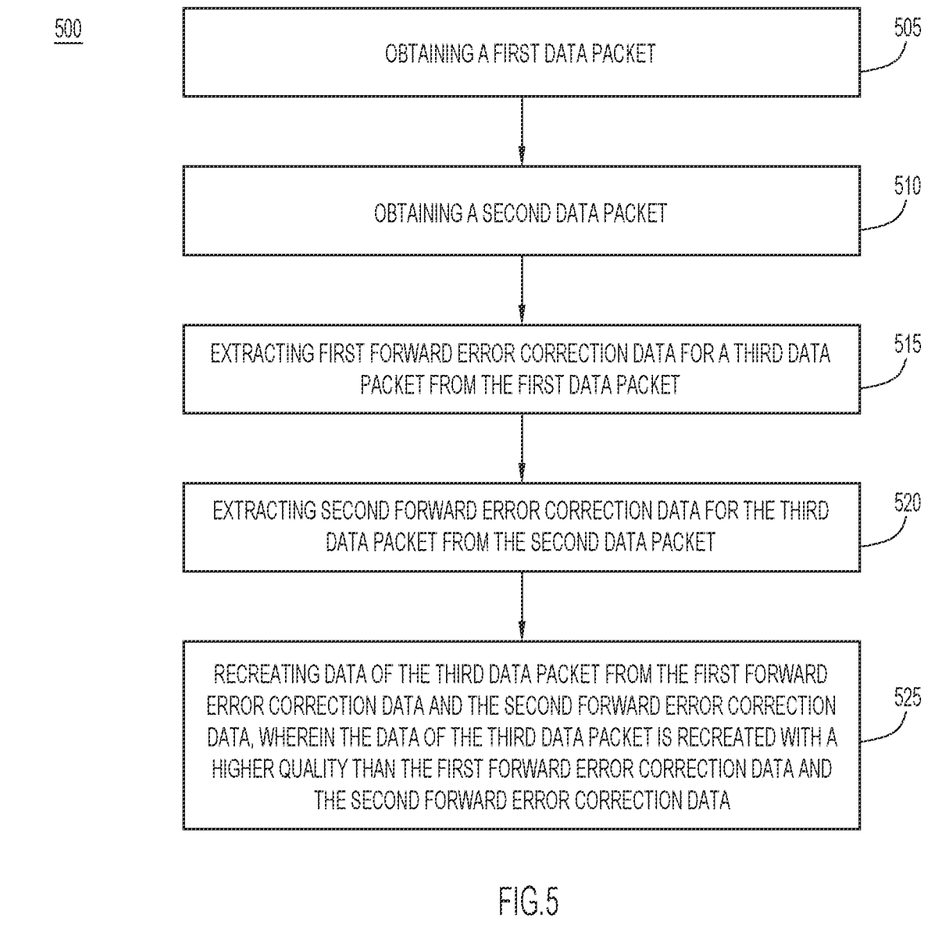
FIG. 5 is a flowchart illustrating a process flow for implementing the disclosed in-band redundant data techniques on the receive side of a communication system, according to an example embodiment.

Turning to FIG. 5, depicted therein is a flowchart 500 illustrating a process flow for implementing the techniques of this disclosure on the receive side of a communication system, such as receive side 250 of FIG. 2.

Flowchart 500 begins in operation 505 in which a first data packet is obtained and continues in operation 510 in which a second data packet is obtained. Accordingly, operations 505 and 510 may be embodied as receive side 250 of FIG. 2 obtaining two or more of packets 105*b-f* of FIG. 1.

According to operation 515, first forward error correction data for a third packet is extracted from the first data packet. Accordingly, operation 515 may be embodied as the extraction of FEC portion 120*b* from packet 105*b*, the extraction of FEC portion 125*c* from packet 105*c*, the extraction of FEC portion 130*d* from packet 105*d*, the extraction of FEC portion 135*e* from packet 105*e*, and/or the extraction of FEC portion 140*f* from packet 105*f*. In other words, operation 515 may be embodied as the extraction of FEC data associated with current data portion 115*a* of packet 105*a* from one of the packets sent subsequent to packet 105*a*, as illustrated in FIG. 1.

In operation 520, second forward error correction data for the third packet is extracted from the second packet. Accordingly, operation 520 may be embodied as the extraction of FEC data associated with current data portion 115*a* of packet 105*a* from one of the packets sent subsequent to packet 105a, as illustrated in FIG. 1, though the packet would be different from which ever packet the FEC data was extracted in operation 515.

Finally, in operation 525, data of the third data packet is recreated from the first forward error correction data and the second forward error correction data. The data of the third data packet is recreated with a higher quality than the first forward error correction data and the second forward error correction data. Accordingly, operation 525 may be embodied as the recreation of data from a lost data packet at receive side 250 as described above with reference to FIGS. 2 and 3 above. For example, operation 525 may be embodied as the recreation of current data portion 115a of packet 105a of FIG. 1 from two or more of FEC portions 120b, 125c, 130d, 135e or 140f of packets 105b-f, respectively.

Figure 6:
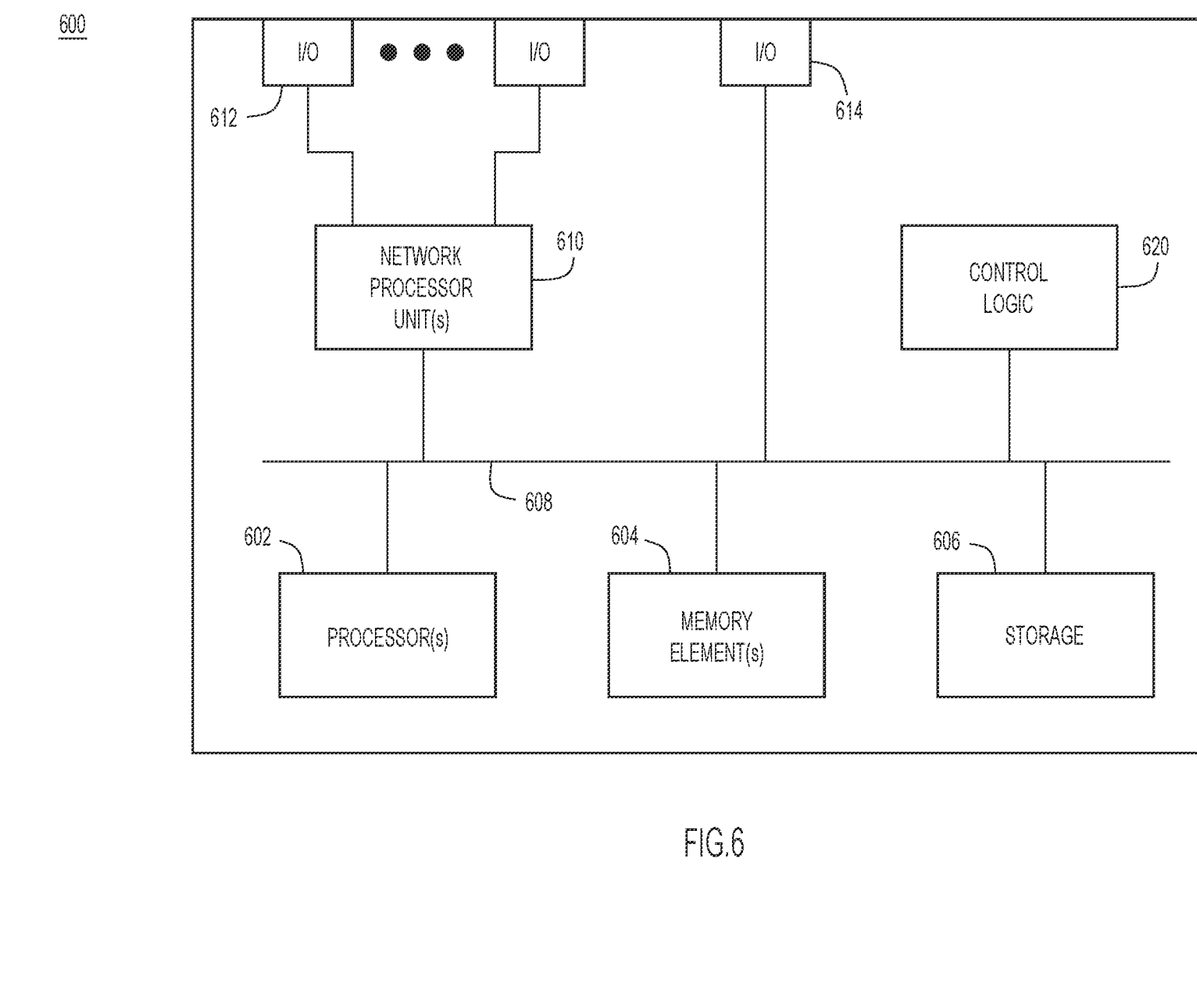
FIG. 6 is a functional block diagram of a processing device configured to implement the disclosed in-band redundant data techniques, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device or apparatus, such as computing device 600 or any combination of computing devices 600, may be configured as any entity/entities as discussed for the techniques depicted in connection with FIGS. 1-5 in order to perform operations of the various techniques discussed herein.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity, and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source, and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques disclosed herein may provide redundancy with an in-band FEC scheme that may improve communication quality in case of packet losses. The techniques may include sending multiple in-band FEC data portions. The disclosed techniques provide methods to optimally allocate the bandwidth to the current data and the FEC data, as well as methods to create multiple FEC encoding representations of the same past data utilizing newly available future context. The techniques also provide for combining these multiple representations on the receive side to achieve better quality than might be achieved using any single one of the FEC representations.

Accordingly, in some aspects, the techniques described herein relate to a method including: encoding a current data portion to generate an encoded current data portion for inclusion in a data packet; encoding, based upon content of the current data portion, a forward error correction data portion for a previous data portion to generate an encoded forward error correction data portion; generating the data packet including the encoded current data portion and the encoded forward error correction data portion; and providing the data packet to a receiver.

In some aspects, the techniques described herein relate to a method, further including encoding a second forward error correction data portion for a second previous data portion to form an encoded second forward error correction data portion, wherein generating the data packet includes generating the data packet including the encoded second forward error correction data portion.

In some aspects, the techniques described herein relate to a method, wherein encoding the second forward error correction data portion includes encoding the second forward error correction data portion at a bitrate lower than a bitrate at which the forward error correction data portion was encoded.

In some aspects, the techniques described herein relate to a method, wherein generating the data packet includes allocating bits within the data packet to the encoded current data portion and the encoded forward error correction data portion based upon the content of the current data portion and content of the forward error correction data portion.

In some aspects, the techniques described herein relate to a method, wherein allocating the bits within the data packet includes allocating fewer bits to data portions having low entropy.

In some aspects, the techniques described herein relate to a method, wherein allocating the bits within the data packet includes allocating greater bits to data portions having high entropy.

In some aspects, the techniques described herein relate to a method, further including: encoding a future data portion to generate an encoded future data portion for inclusion in a future data packet; encoding the current data portion to generate an encoded first future forward error correction data portion for inclusion in future data packet; encoding the forward error correction data portion to generate an encoded second future forward error correction data portion for inclusion in future data packet; generating the future data packet including the encoded future data portion, the encoded first future forward error correction data portion, and the encoded second future forward error correction data portion; and providing the future data packet to the receiver.

In some aspects, the techniques described herein relate to a method, wherein encoding the current data portion includes encoding audio data using a neural audio codec.

In some aspects, the techniques described herein relate to a method including: obtaining a first data packet; obtaining a second data packet; extracting first forward error correction data for a third data packet from the first data packet; extracting second forward error correction data for the third data packet from the second data packet; and recreating data of the third data packet from the first forward error correction data and the second forward error correction data with a higher quality than the first forward error correction data and the second forward error correction data.

In some aspects, the techniques described herein relate to a method, wherein data of the third data packet is encoded in the first forward error correction data and the second forward error correction data at different bitrates.

In some aspects, the techniques described herein relate to a method, wherein data of the third data packet is encoded in the first forward error correction data and the second forward error correction data using different encoding techniques.

In some aspects, the techniques described herein relate to a method, wherein the first forward error correction data is encoded based upon content of current data included in the first data packet.

In some aspects, the techniques described herein relate to a method, wherein recreating the data of the third data packet with the higher quality than the first forward error correction data and the second forward error correction data includes recreating the data of the third data packet with a higher bitrate than the first forward error correction data and the second forward error correction data.

In some aspects, the techniques described herein relate to an apparatus including: one or more network interfaces; and one or more processors configured to: encode a current data portion to generate an encoded current data portion for inclusion in a data packet; encode, based upon content of the current data portion, a forward error correction data portion for a previous data portion to generate an encoded forward error correction data portion; generate the data packet including the encoded current data portion and the encoded forward error correction data portion; and provide the data packet to a receiver via the one or more network interfaces.

In some aspects, the techniques described herein relate to an apparatus, wherein the one or more processors are further configured to encode a second forward error correction data portion for a second previous data portion to form an encoded second forward error correction data portion; and wherein the one or more processors are configured to generate the data packet by generating the data packet including the encoded second forward error correction data portion.

In some aspects, the techniques described herein relate to an apparatus, wherein the one or more processors are configured to encode the second forward error correction data portion by encoding the second forward error correction data portion at a bitrate lower than a bitrate at which the forward error correction data portion was encoded.

In some aspects, the techniques described herein relate to an apparatus, wherein the one or more processors are configured to generate the data packet by allocating bits within the data packet to the encoded current data portion and the encoded forward error correction data portion based upon the content of the current data portion and content of the forward error correction data portion.

In some aspects, the techniques described herein relate to an apparatus, wherein the one or more processors are configured to allocate the bits within the data packet by allocating fewer bits to data portions having low entropy.

In some aspects, the techniques described herein relate to an apparatus, wherein the one or more processors are further configured to: encode a future data portion to generate an encoded future data portion for inclusion in a future data packet; encode the current data portion to generate an encoded first future forward error correction data portion for inclusion in future data packet; encode the forward error correction data portion to generate an encoded second future forward error correction data portion for inclusion in future data packet; generate the future data packet including the encoded future data portion, the encoded first future forward error correction data portion, and the encoded second future forward error correction data portion; and provide the future data packet to the receiver via the one or more network interfaces.

In some aspects, the techniques described herein relate to an apparatus, wherein the one or more processors are configured to encode the current data portion by encoding audio data using a neural audio codec.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   encoding a current data portion to generate an encoded current data portion for inclusion in a data packet;
   encoding, based upon content of the current data portion, a forward error correction data portion for a previous data portion to generate an encoded forward error correction data portion;
   generating the data packet comprising the encoded current data portion and the encoded forward error correction data portion; and
   providing the data packet to a receiver.

2. The method of claim 1, further comprising encoding a second forward error correction data portion for a second previous data portion to form an encoded second forward error correction data portion,
   wherein generating the data packet comprises generating the data packet comprising the encoded second forward error correction data portion.

3. The method of claim 2, wherein encoding the second forward error correction data portion comprises encoding the second forward error correction data portion at a bitrate lower than a bitrate at which the forward error correction data portion was encoded.

4. The method of claim 1, wherein generating the data packet comprises allocating bits within the data packet to the encoded current data portion and the encoded forward error correction data portion based upon the content of the current data portion and content of the forward error correction data portion.

5. The method of claim 4, wherein allocating the bits within the data packet comprises allocating fewer bits to data portions having low entropy.

6. The method of claim 4, wherein allocating the bits within the data packet comprises allocating greater bits to data portions having high entropy.

7. The method of claim 1, further comprising:
   encoding a future data portion to generate an encoded future data portion for inclusion in a future data packet;
   encoding the current data portion to generate an encoded first future forward error correction data portion for inclusion in future data packet;
   encoding the forward error correction data portion to generate an encoded second future forward error correction data portion for inclusion in future data packet;

generating the future data packet comprising the encoded future data portion, the encoded first future forward error correction data portion, and the encoded second future forward error correction data portion; and providing the future data packet to the receiver.

8. The method of claim 1, wherein encoding the current data portion comprises encoding audio data using a neural audio codec.

9. A method comprising:
obtaining a first data packet;
obtaining a second data packet;
extracting first forward error correction data for a third data packet from the first data packet;
extracting second forward error correction data for the third data packet from the second data packet; and
recreating data of the third data packet from the first forward error correction data and the second forward error correction data with a higher quality than the first forward error correction data and the second forward error correction data.

10. The method of claim 9, wherein data of the third data packet is encoded in the first forward error correction data and the second forward error correction data at different bitrates.

11. The method of claim 9, wherein data of the third data packet is encoded in the first forward error correction data and the second forward error correction data using different encoding techniques.

12. The method of claim 9, wherein the first forward error correction data is encoded based upon content of current data included in the first data packet.

13. The method of claim 9, wherein recreating the data of the third data packet with the higher quality than the first forward error correction data and the second forward error correction data comprises recreating the data of the third data packet with a higher bitrate than the first forward error correction data and the second forward error correction data.

14. An apparatus comprising:
one or more network interfaces; and
one or more processors configured to:
encode a current data portion to generate an encoded current data portion for inclusion in a data packet;
encode, based upon content of the current data portion, a forward error correction data portion for a previous data portion to generate an encoded forward error correction data portion;
generate the data packet comprising the encoded current data portion and the encoded forward error correction data portion; and
provide the data packet to a receiver via the one or more network interfaces.

15. The apparatus of claim 14, wherein the one or more processors are further configured to encode a second forward error correction data portion for a second previous data portion to form an encoded second forward error correction data portion; and
wherein the one or more processors are configured to generate the data packet by generating the data packet comprising the encoded second forward error correction data portion.

16. The apparatus of claim 15, wherein the one or more processors are configured to encode the second forward error correction data portion by encoding the second forward error correction data portion at a bitrate lower than a bitrate at which the forward error correction data portion was encoded.

17. The apparatus of claim 14, wherein the one or more processors are configured to generate the data packet by allocating bits within the data packet to the encoded current data portion and the encoded forward error correction data portion based upon the content of the current data portion and content of the forward error correction data portion.

18. The apparatus of claim 17, wherein the one or more processors are configured to allocate the bits within the data packet by allocating fewer bits to data portions having low entropy.

19. The apparatus of claim 14, wherein the one or more processors are further configured to:
encode a future data portion to generate an encoded future data portion for inclusion in a future data packet;
encode the current data portion to generate an encoded first future forward error correction data portion for inclusion in future data packet;
encode the forward error correction data portion to generate an encoded second future forward error correction data portion for inclusion in future data packet;
generate the future data packet comprising the encoded future data portion, the encoded first future forward error correction data portion, and the encoded second future forward error correction data portion; and
provide the future data packet to the receiver via the one or more network interfaces.

20. The apparatus of claim 14, wherein the one or more processors are configured to encode the current data portion by encoding audio data using a neural audio codec.

* * * * *